(12) United States Patent
Helander

(10) Patent No.: US 6,258,197 B1
(45) Date of Patent: Jul. 10, 2001

(54) METHOD FOR MANUFACTURING PIPE FITTING, AND PIPE FITTING

(75) Inventor: Ossi Helander, Heinola (FI)

(73) Assignee: Uponor Innovation AB, Fristad (SE)

( * ) Notice: Subject to any disclaimer, the term of this patent is extended or adjusted under 35 U.S.C. 154(b) by 0 days.

(21) Appl. No.: 09/171,738

(22) PCT Filed: May 20, 1997

(86) PCT No.: PCT/FI97/00297

§ 371 Date: Oct. 23, 1998

§ 102(e) Date: Oct. 23, 1998

(87) PCT Pub. No.: WO97/44173

PCT Pub. Date: Nov. 27, 1997

(30) Foreign Application Priority Data

May 23, 1996 (FI) .......................................... 962187

(51) Int. Cl.⁷ .................................................. B29C 45/14
(52) U.S. Cl. .......................... 156/188; 156/195; 138/144
(58) Field of Search .................................. 156/172, 173, 156/175, 189, 188, 185, 187, 191, 192, 195, 171; 219/535, 544; 138/140, 141, 142, 144

(56) References Cited

U.S. PATENT DOCUMENTS

| 4,265,951 | * | 5/1981 | Yates et al. | 428/36 |
| 4,329,193 | * | 5/1982 | Sznopek et al. | 156/162 |
| 5,169,176 | * | 12/1992 | Brossard | 285/21 |
| 5,255,943 | * | 10/1993 | Keller et al. | 285/21 |

FOREIGN PATENT DOCUMENTS

| 162588 | | 11/1991 | (DK) . |
| 1373761 | * | 11/1974 | (GB) . |
| 2090558 | | 7/1982 | (GB) . |
| 2232330 | | 12/1990 | (GB) . |
| 9533109 | | 12/1995 | (WO) . |

\* cited by examiner

*Primary Examiner*—James Sells
(74) *Attorney, Agent, or Firm*—Ladas & Parry

(57) ABSTRACT

The invention relates to a method for manufacturing a pipe fitting, said method comprising manufacturing a preform (1) of plastic, and forming an additional layer (3) on top of it. According to the invention, the additional layer (3) is formed by winding a film on the preform until the desired total wall thickness is reached, and the film is wound using at the same time pretensioning in a desired direction. The invention further relates to a pipe fitting manufactured by this method.

23 Claims, 1 Drawing Sheet

METHOD FOR MANUFACTURING PIPE FITTING, AND PIPE FITTING

FIELD OF INVENTION

The invention relates to a method for manufacturing a pipe fitting, said method comprising manufacturing a preform of plastic, and forming an additional layer on top of it. The invention further relates to a pipe fitting comprising a preform made of plastic, and an additional layer mounted on top of the preform.

BACKGROUND OF INVENTION

Finnish Patent Application No. 912498 discloses a multilayer sleeve connection, whose layers are made by extruding, injection molding, or by a crosslinking process. One layer is a reinforcement layer which may also contain metal. The sleeve further comprises resistance wire winding mounted on its inner surface for welding the sleeve to the pipe connected to it.

Application EP 055 891 discloses the technology that is most commonly used at present. This technology comprises manufacturing at first a preform by injection molding, winding a resistance wire on the preform, and injection molding a reinforcement layer on top of the preform and the resistance wire, whereby the preform and the reinforcement portion are at least partly welded together.

Application GB 2 232 330 discloses a sleeve manufacturing method comprising winding a thermoplastic tape which is obtained from an extruder and which is in a molten or soft state on a mandrel, and fusing the edges of the windings together.

Prior art solutions are also disclosed in DK 162588 and WO 9515253.

One of the drawbacks of the prior art solutions mentioned above is that it is uneconomic to manufacture particularly large branch fittings with the above-mentioned conventional methods, since a large amount of material to be injected requires a long cooling time. In addition, the structures are often massive in order for the required strength to be provided, and the tool costs as well as investments in the injection molding machines are extremely high.

SUMMARY OF INVENTION

It is an object of the present invention to obviate the above-mentioned drawbacks. This is achieved with the method of the invention, which is mainly characterized by forming the additional layer by winding a film on the preform until the desired total wall thickness is reached, and that the film is wound using at the same time pre-tensioning in a desired direction. Correspondingly, the pipe fitting is characterized in that the additional layer comprises an oriented plastic film wound on the preform.

With the solution of the invention, in which the film to be wound is oriented in the desired direction by means of pre-tensioning in a suitable tensioning direction, a smaller total layer thickness is achieved than with a sleeve made entirely by injection molding. A film or tape to be wound is not obtained from the extruder as a semi-finished product, but for instance on a storage reel as a product that has gone through all manufacturing steps. In the case of GB 2 232 330, in which the tape to be wound is obtained directly from the extruder while still soft and obviously thick, such a result is not achieved; in this case, the tape cannot be tensioned and thereby oriented in the same way as in the present invention, and it has not even been attempted. In addition, the lack of a preform complicates the manufacturing process.

The speed of the method of the invention mainly depends on the speed of the winding process, not on the cooling times, which is a significant advantage over all the prior art solutions described above.

Furthermore, the winding of the invention allows the film that is wound to consist of one or several different plastic films optionally reinforced with plastic, glass or carbon fibers, for example, or with a wire mesh, or a suitable combination of these.

Resistance means are preferably mounted between the preform and the additional layer, and connected to contact pins provided at the ends of the preform. By means of the resistance means, the pipes to be connected by the pipe fitting can be welded together, as stated above in connection with European Patent Application No. 055 891. It is also possible to weld the preform and the additional layer together when the pipes are connected; this property can be utilized in the present invention when bent fittings are required, for example. The position of a fitting can be steplessly adjusted to a desired angle and locked by resistance heating: the fitting is heated until even the film windings are at least partly welded to each other.

BRIEF DESCRIPTION OF THE DRAWING

In the following, the invention will be described by means of an example with reference to the accompanying drawings, in which.

DETAILED DESCRIPTION

The method of the invention comprises manufacturing at first, for example by injection molding a preform 1, on top of which electrically conducting resistance means 2 (e.g. a resistance wire, resistance mat, electrically conducting mat, or the like) are wound and connected to contact pins 4 provided at the ends of the preform 1.

Figure 1:
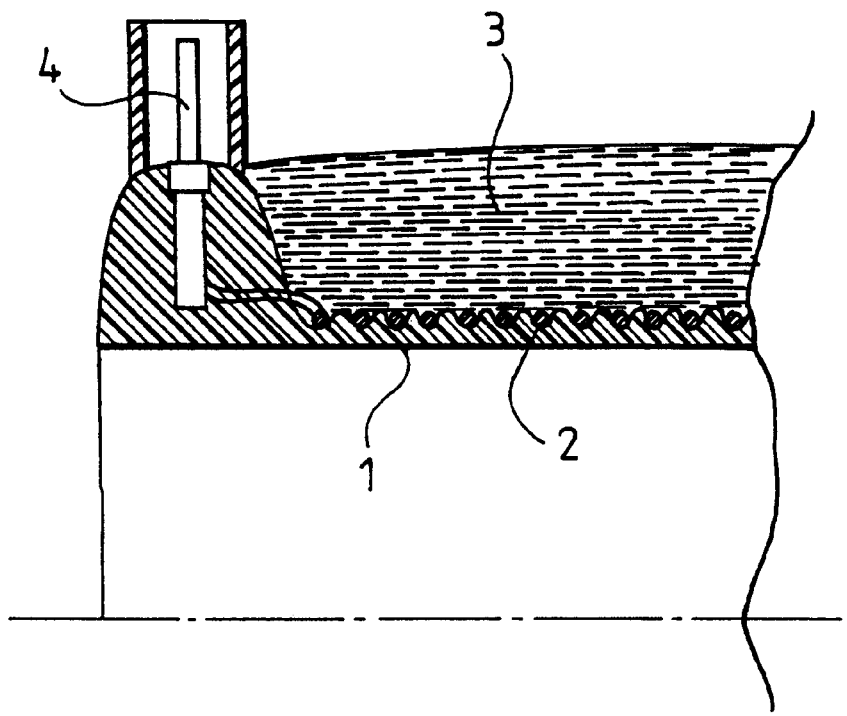
FIG. 1 is a longitudinal section of one end of a pipe fitting of the invention.
Figure 2:
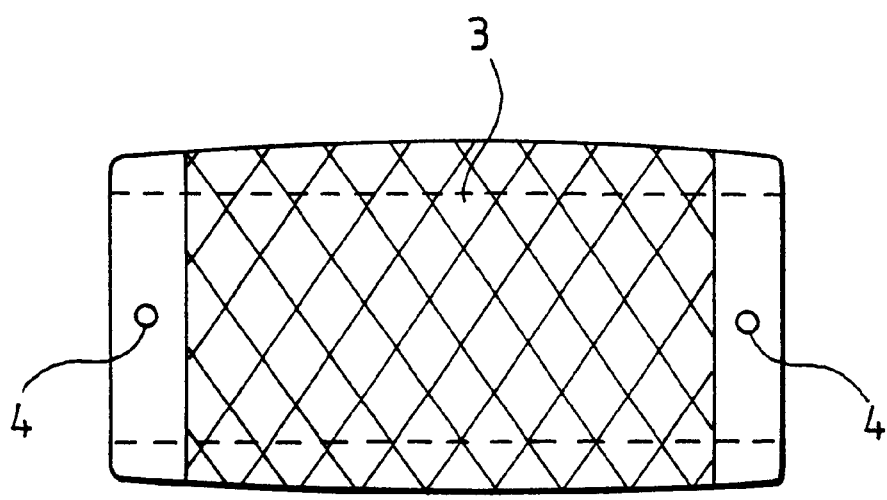
FIG. 2 is a side view of a completed pipe fitting.

An additional layer 3 of polyethylene film, for example, is wound thereafter on the preform 1 to form the body of the pipe fitting. The desired total wall thickness is achieved by the use of suitable pre-tensioning and a desired tensioning direction. On account of the resulting oriented structure of the body, the total wall thickness is clearly smaller than, for instance, in a corresponding pipe fitting made entirely by injection molding. In this example, the winding is performed crosswise, as shown in FIG. 2. The crosswise winding may be performed by changing the winding direction at any point of the pipe fitting, for example at the ends of the fitting or after each wind.

The width of the film to be wound may preferably be in the range of 20 to 50 mm, and the thickness in the range of 0.05 to 0.1 mm. If desired, the additional layer 3 may also be made of several different plastic films. In addition to these films, it is possible to use reinforcements, for instance technical reinforcement fibers, such as plastic, glass and carbon fibers, and metal reinforcements, such as a wire mesh. If higher requirements are set for instance for the heat and wear resistance of the surface of the pipe fitting, the surface winds of the additional layer may be formed of a film with which these properties can be achieved.

It is possible to injection mold a thin protective layer or to use a shrink film, for example, on the film layer, or body 3, if necessary for aesthetic reasons, for instance.

The strong oriented structure of the body 3 allows preforms 1 of light construction to be used, whereby the wound body 3 may form the greatest part of the wall thickness of the pipe fitting.

In the above, the invention has been described only by way of example. One skilled in the art may implement the details of the invention in many alternative ways within the scope of the appended claims. The heating and welding, for example, thus do not necessarily have to be performed by means of electric heating, as described above.

What is claimed is:

1. A method for manufacturing a pipe fitting with a desired wall thickness comprising:
    (a) making a preform of elastic having a preform wall with a thickness that is less than the desired wall thickness; and
    (b) forming an additional layer on top of the preform by winding a plurality of film layers comprising plastic onto the preform wall to form the pipe fitting with the desired wall thickness, said winding comprising pre-tensioning the plurality of plastic film layers in a desired direction during the winding.

2. A method according to claim 1 wherein the film layers are wound crosswise at a desired angle.

3. A method according to claim 1, wherein the additional layer consists essentially of a plastic film.

4. A method according to claim 1, wherein the additional layer consists essentially of a plurality of different plastic films.

5. A method according to claim 1, wherein the additional layer consists essentially of a plastic film or a plurality of different plastic films and a material other than plastic.

6. A method according to claim 1, wherein the additional layer is provided with a reinforcement selected from the group consisting of plastic, glass fibers, carbon fibers and wire mesh.

7. A method according to claim 1 comprising, prior to the winding, mounting electrically conducting means on the preform for heating the pipe fitting to a welding temperature.

8. A method according to claim 7, wherein the pipe fitting is provided with contact pins and the method comprises fusing the preform and the additional layer at least partly together by conducting electric energy to the contact pins.

9. A method according to claim 8, comprising also fusing winds of the film layers at least partly together.

10. A method according to claim 1, comprising injection molding a thick protective layer of plastic on the additional layer.

11. A method according to claim 1, comprising mounting a thick film of plastic on top of the additional layer.

12. A method according to claim 1, wherein the preform is made by injection molding.

13. A pipe fitting comprising a plastic preform and an additional layer fixedly mounted on top of the preform, said additional layer comprising a plurality of oriented plastic film layers wound on the preform, said pipe fitting being made by the method of claim 1.

14. A pipe fitting according to claim 13, wherein the additional layer comprises film winds that are wound crosswise.

15. A pipe fitting according to claim 13 wherein the additional layer is thicker than the preform.

16. A pipe fitting according to claim 13, wherein the additional layer forms the body of the pipe fitting.

17. A pipe fitting according to claim 13, wherein the additional layer comprises a polyethylene film with a width in the range of 20 to 50 mm and a thickness in the range of 0.05 to 0.1 mm.

18. A pipe fitting according to claim 13, wherein the additional layer comprises a plurality of different plastic films.

19. A pipe fitting according to claim 13, wherein the additional layer consists essentially of a plastic film or a plurality of different plastic films and a material other than plastic.

20. A pipe fitting according to claim 13, wherein the additional layer is provided with a reinforcement selected from the group consisting of plastic glass fibers, carbon fibers and wire mesh.

21. A pipe fitting according to claim 13, wherein electronically conducting means are disposed between the preform and the additional layer for heating at least part of the pipe fitting to a welding temperature.

22. A pipe fitting according to claim 13, comprising a thin protective layer of injection molded plastic on top of the additional layer.

23. A pipe fitting according to claim 13, comprising a shrink film of plastic on top of the additional layer.

* * * * *